April 4, 1939.  A. K. STEWART  2,152,713
AUTOMOBILE TRAILER
Original Filed Aug. 15, 1936    5 Sheets-Sheet 1
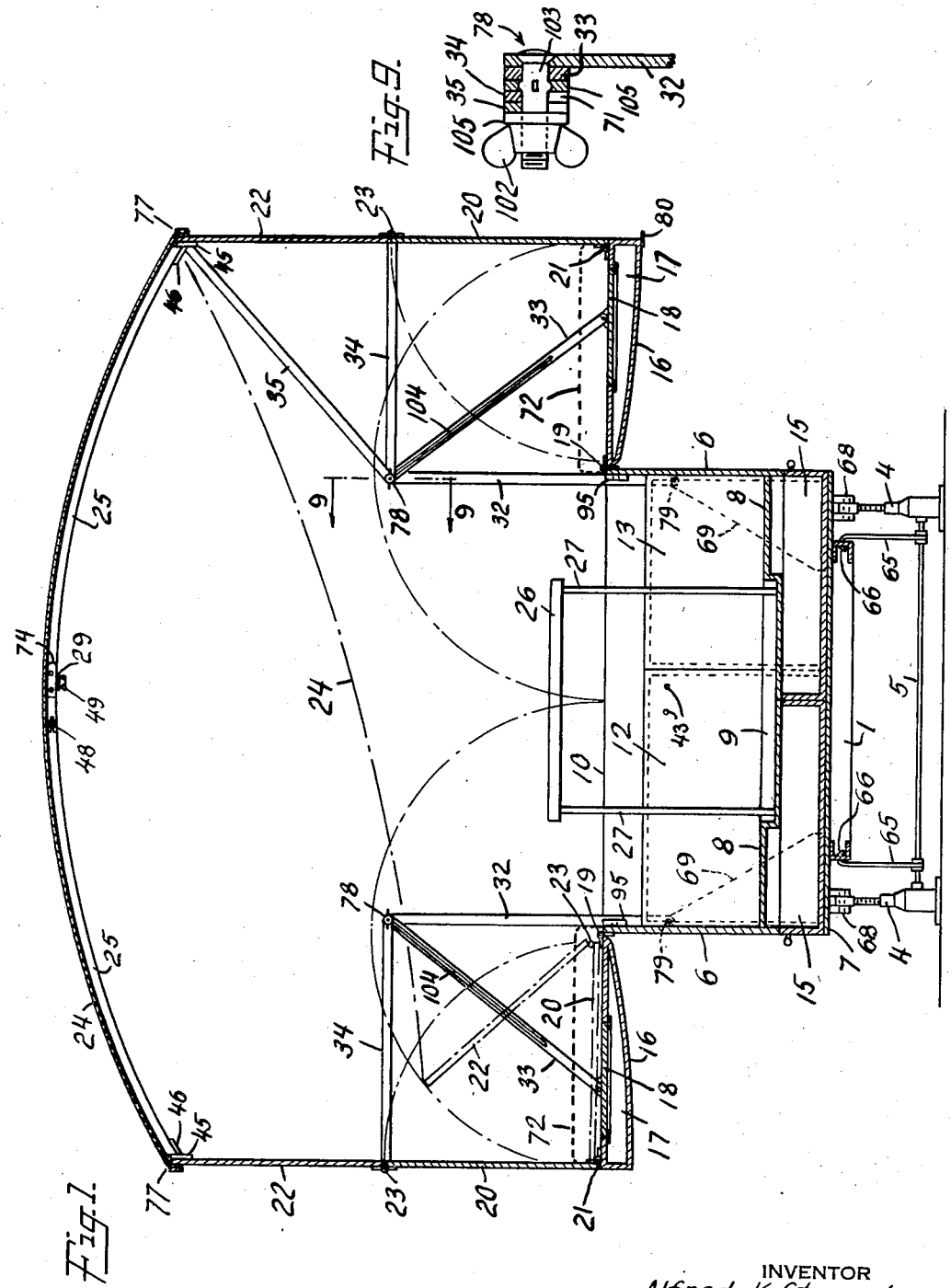
INVENTOR
Alfred K. Stewart
BY
Marshall & Hawley
ATTORNEYS

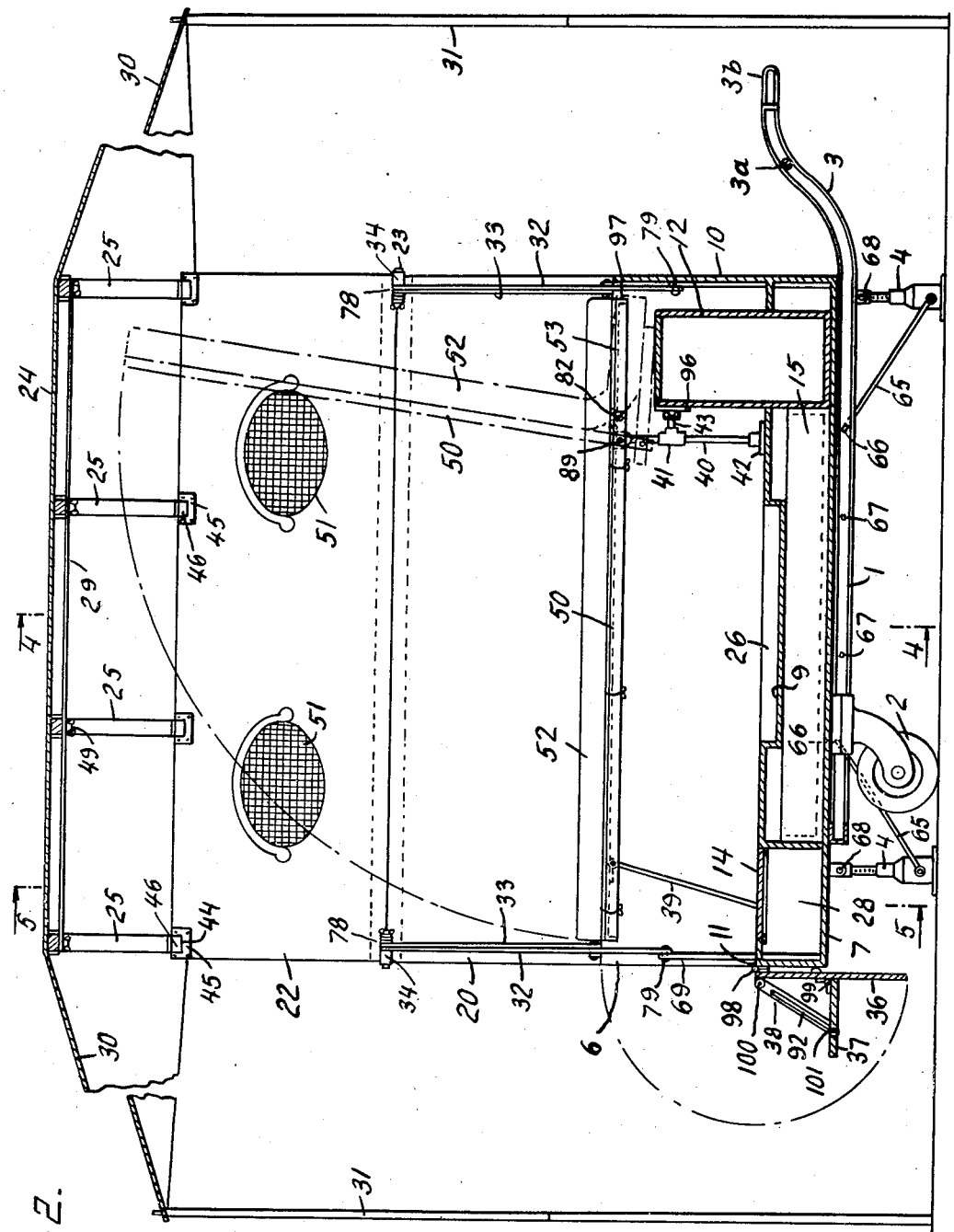

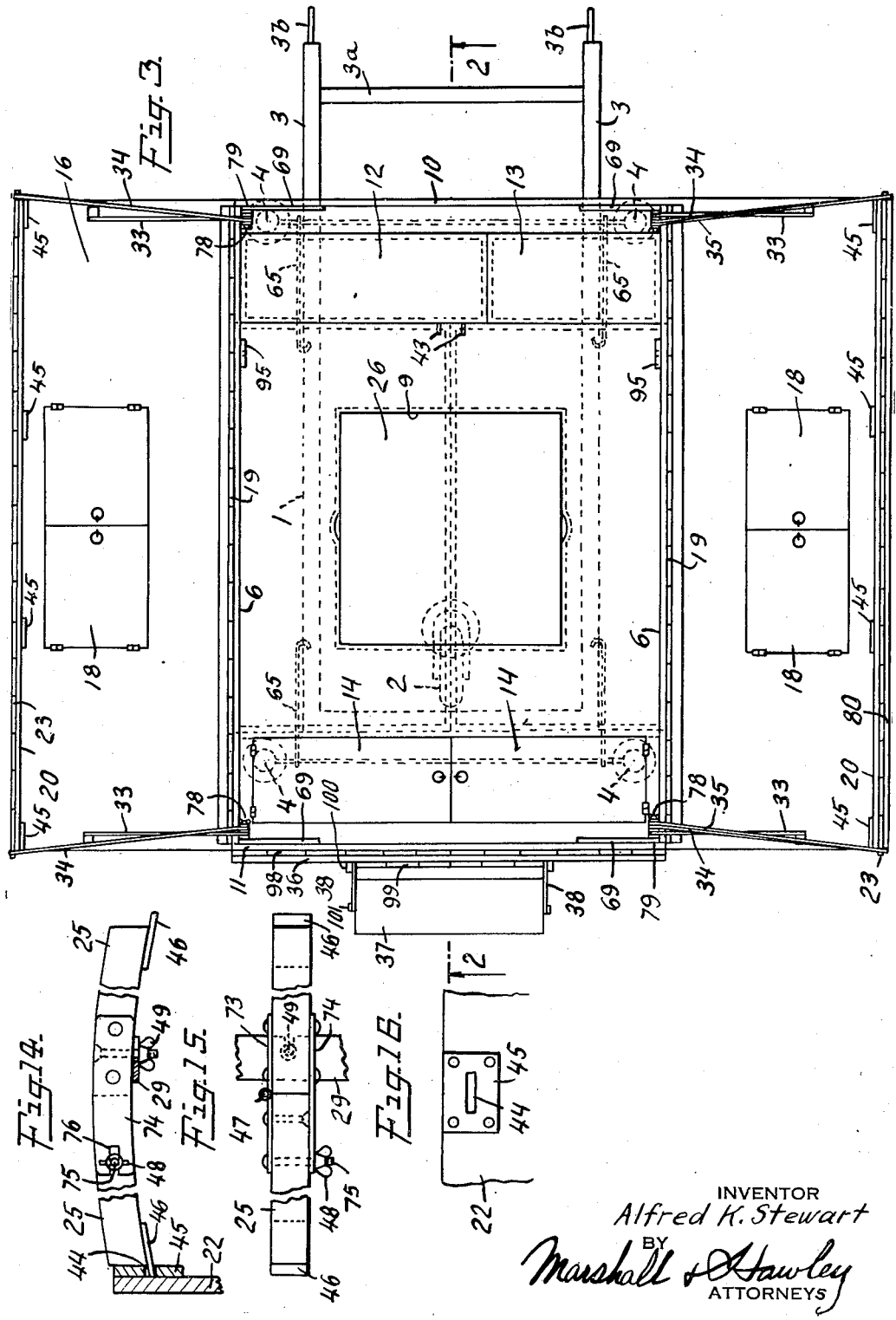

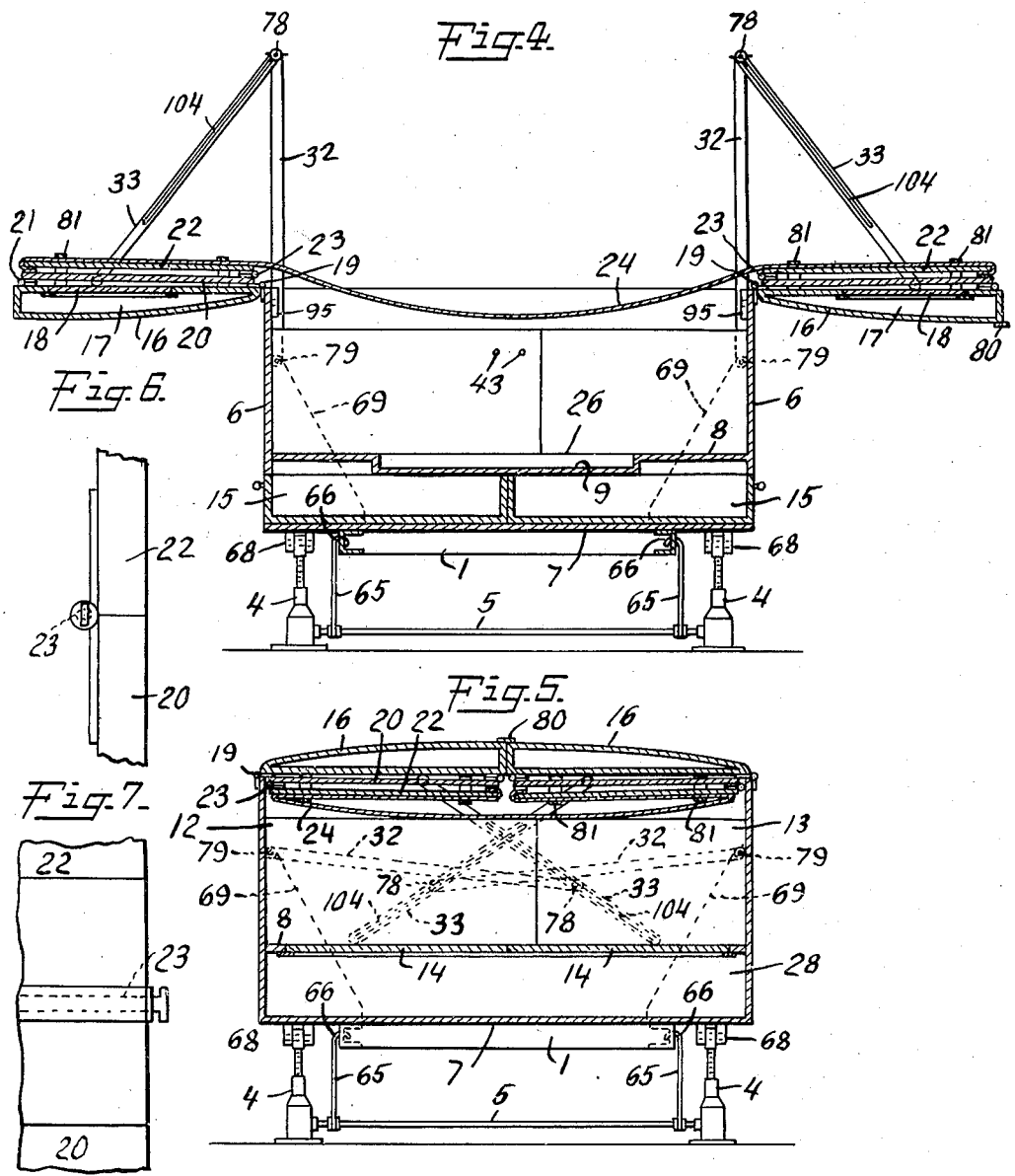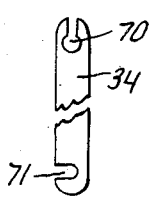

April 4, 1939. A. K. STEWART 2,152,713
AUTOMOBILE TRAILER
Original Filed Aug. 15, 1936 5 Sheets-Sheet 5
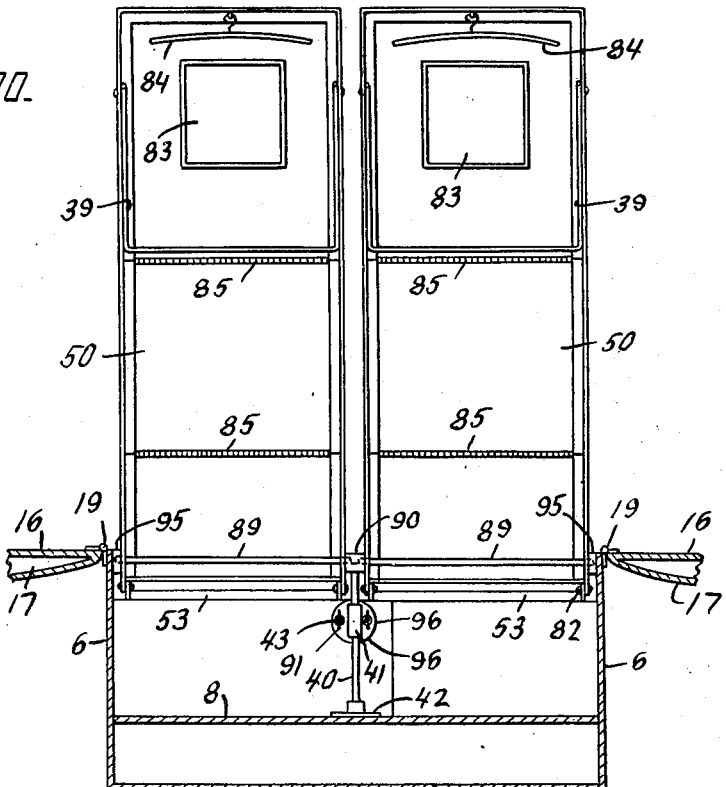
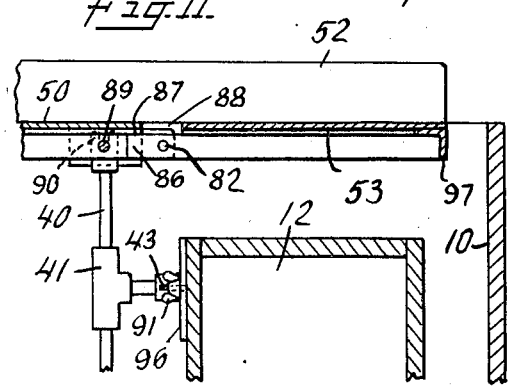
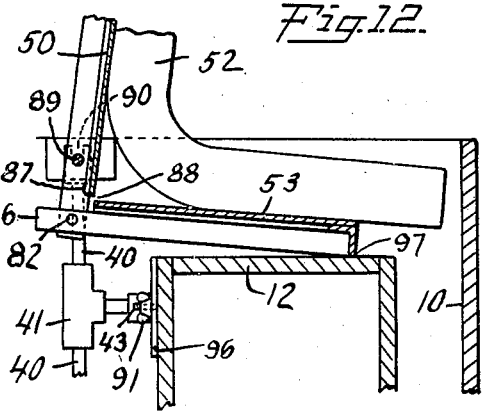
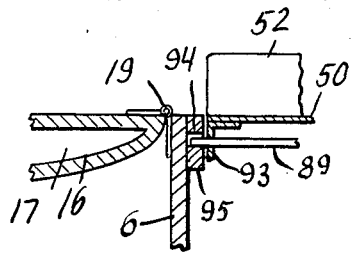
INVENTOR
Alfred K. Stewart
BY
Marshall & Hawley
ATTORNEYS Patented Apr. 4, 1939

2,152,713

UNITED STATES PATENT OFFICE 2,152,713

AUTOMOBILE TRAILER

Alfred K. Stewart, Yonkers, N. Y.

Application August 15, 1936, Serial No. 96,133
Renewed September 7, 1938

3 Claims. (Cl. 296—23)

This invention relates to the class of vehicles, commonly referred to as trailers, or camping wagons, or the like, of a type adapted to be towed at the rear by automobiles, or other motor cars, as they do not ordinarily propel under their own power; and particularly it relates to a small, compact, and easily transported type of trailer, intended to serve as a rolling house, that may be closed up into a small, compact, and consolidated unit, but which has a superstructure collapsible in nature, and which may be opened up and expanded so as to be set up in a sizable tent formation to furnish a sleeping, eating, amusement or family compartment, as readily as might an ordinary tent of similar capacity. The great and rapid increase in our mobile population makes necessary the adequate improvement in a carriage of this character.

To rapidly summarize some of the leading features of the invention, it may be said further to consist in the arrangement of a substantial under frame consisting of a stock chassis having a single castor-like swivel wheel, centrally located for the facilitation of smoother and swifter propulsion of the trailer vehicle when the latter is coupled to the rear of a power vehicle, usually to the bumper or other outguard frame of the same, to be hauled along tandem, but readily detachable at camping points or rest stations. The chassis mounts a rigid body or compartment which functions as a household carry-all and provides seats, tables, sleeping accommodations, and multiple appliances for refreshment and comfort.

Included in the structure is a suitable folding framework, conjoined with the body, which supports a canvas roof upheld effectively as a canopy by a plurality of folding rafters, said roof and associated features being placed in service or folded position with slight physical exertion, whereby the trailer when open is expected to provide a tentlike covering held taut to combine with panels and braces and other parts of the body, and afford a complete solid enclosure, storm, dust, and accident proof, that may be collapsed between the lateral folding panels of the construction in the elaboration of my improved compartmental trailer design. Within the same, couches or seats, beds and tables, movable in various ways for various uses are arranged and adjustably placed in useful relation. This applies with similar force to numerous other interior features, consisting of clothes drawers and equipment of various kinds, pouches for holding all kinds of different articles, a complete refrigeration arrangement and food drawers and other provision receptacles, in association with which suitable spaces and holders are provided for carrying stores of canned and other food, so as to have the same in readiness for convenient use at all times.

The trailing of the vehicle from the rear of a motor car does not interfere with its usefulness as a dwelling or living apartment. It consists of such a simple number and arrangement of parts that it can be easily and quickly converted into a camping outfit, and its parts are as readily folded and stored in compact form within the body, being entirely storm and dust proof, whether the parts are in the folded or unfolded condition. The invention also involves numerous improvements in the tent structure and in the means for extending and upholding extra canvas tops which greatly enlarge the capacity of the interior of the tent, all comprising mechanism quickly and readily assembled and disassembled.

When the parts are in their assembled and operative relation they are rigid in position so that they will withstand high storm pressure and rains, but being of such a simple and convenient composition that the sections may be very readily changed within the body of the vehicle, without any such unfolding weakening the substantial values of the parts for effective and rigid positioning when supported after unfolding. In thus carrying the tent construction into a useful form, the conversion is made without interfering with the accessibility and convenient arrangement of the various compartments wherein are stored such camping necessities as dishes, utensils, stoves, tables, and all sorts of foods and drinkables.

The arrangement of the beds, couches, and seats possesses peculiar features of construction and braced relation, affording comfortable couches for use by day, and beds for use at night, together with appropriately arranged curtains. The beds are a suitable distance above the ground so that the occupants are not discommoded by damp conditions. The sleeping accommodations are very simple and compact in form so that they can be easily enclosed within the vehicle body when the parts are arranged in consolidated packed running position.

There is furnished therefore, a very simple and easily operated trailer body having an unusually large amount of space when opened for use, but collapsing easily and quickly into a low compact form so that it does not interfere with vision from the rear of the automobile; and as the panels and other parts close up very tightly into a small space, the object thus formed when it is in action running behind the car is not so prominent as to interfere with the refined appearance of the automobile, but is simply a small rather inconspicuous, and swift accessory appended to the design of the car and not interfering therewith in any way.

And further the invention having these various purposes among others which might be mentioned, and consisting of these pre-eminent features as stated, may be said to consist essentially of the same and of the various objective elements which will hereinafter be described and claimed and also the numerous details and peculiarities thereof which make up the combination, arrangement and construction of parts for the purpose in view, and the uses stated, substantially as will be set forth and claimed.

In the accompanying drawings illustrating my invention,

Fig. 1 is a transverse cross-sectional view of the entire trailer when in the unfolded and set-up position in which it is ready for camping and other use as desired;

Fig. 2 is a longitudinal section of the same with certain parts in elevation, taken centrally through the interior of the mechanism on the line 2—2 of Fig. 3;

Fig. 3 is a top plan view of the entire mechanism when the trailer is open and occupying the position shown in Fig. 1 with the upper tent portion removed;

Fig. 4 shows the various parts in the position that they occupy after they have been collapsed and partially folded in order to close the same together for travel, certain parts thereof being shown in cross-section on the line 4—4 of Figure 2.

Fig. 5 is a similar cross-sectional view when the trailer has been entirely folded together in a collapsed and completely closed position secure against the entrance of dust and weather, taken on line 5—5 of Fig. 2.

Fig. 6 is an enlarged fragmentary view of the hinge device which unites the edges of the side longitudinal panels of the main frame;

Fig. 7 is an enlarged fragment of the same parts in horizontal plan to indicate the end of the hinge pintle which connects with a brace;

Fig. 8 is a broken detail of one of the braces and shows the ends thereof which unite removably with other parts;

Fig. 9 is a sectional detail of a group of connected parts taken on the line 9—9 of Fig. 1;

Fig. 10 is an elevational view of an interior pair of couches when they occupy their raised position above the flooring of the van and before being lowered into sleeping position.

Fig. 11 is a vertical sectional detail of one end of an inner couch when occupying the horizontal or sleeping position, and shows the way in which it is supported in relation to the floor and main frame of the trailer.

Fig. 12 is a sectional view of the same parts when the bed or couch has been raised from the position shown in Fig. 11 to the position shown in Fig. 10 and indicates the changed relation of the various parts to each other.

Fig. 13 is an enlarged detail view of the means whereby one of these inner beds is hinged at the outside of the frame for convenience in lifting and lowering the same.

Figs. 14, 15 and 16 show details of the rafters in the roof.

Like characters of reference designate like parts in all the different figures of the drawings.

The horizontal structure or chassis which forms the main support of the body of the car is composed of a rectangular elongated metal frame 1, having located centrally beneath the same a single wheel 2, suitably supported and carried in the chassis 1, it being swivelled therein so that it can swing to and fro, and the wheel itself being of the usual automobile type, preferably small in diameter and carrying a resilient tire. It is found in practice that a single wheel or roller is sufficient while the car is travelling on the road, although there may be several if desired. The chassis 1 is provided with forwardly extending parallel arms 3, 3 connected together by a crosspiece 3ª, each arm 3 having a rounded or other shaped end 3ᵇ which will interlock with a spring clamp or otherwise in a socket in the rear portion of the motor car which is drawing the trailer, it being usually found that the bumper of the car is the best part with which to make the attachment.

When the trailer is in motion, the single wheel 2 is the only feature supporting the chassis and body beneath the same. When it is at rest however, it is found desirable to support it at various points besides the roller support in order that it may be kept level and free from tilting and will sustain weight at different points. I have arranged therefor supporting means to uphold the construction on both sides thereof, the same consisting of two jacks 4, at each end of the body. These jacks are of any ordinary and common type so that they may be capable of being raised and lowered in order to lift the body of the car up or down.

In Figs. 1, 2, 4 and 5 the jacks are shown as resting on the ground. Each pair of jacks 4 is provided with a frame consisting of side rods 65, and a horizontal connecting rod 5, the ends of said rod 5 being attached to the two jacks. These jacks are pivotally hung at 68 beneath the vehicle body. The ends of the side rods 65 are hooked at 66 and engage openings in the chassis frame 1, or some other underneath section of the main frame below the body. Thus with this construction it is possible to allow the jacks to assume the upright position shown in the drawings, or to lift and turn them on their pivots at 68 upward into a horizontal position where the curved ends 66 of the bracing frames can be caused to enter other openings nearer to the center of the chassis 1 at 67, and thus hold the jacks in their horizontal and idle position. When the vehicle is at a standstill however, and is to be used to accommodate the passengers in the interior, then obviously the jacks will all be dropped down into their vertical supporting positions by taking the ends 66 of the braces out of the openings 67 and causing them to enter the other openings prepared for them to engage when the braces are in their inclined active position, as shown in Fig. 2, where they hold the jacks immovable in a vertical supporting position.

Secured rigidly upon the main chassis 1 is a main body having a horizontal bottom flooring 7, and at a suitable distance above it is a second inner floor 8, parallel thereto, and which forms the main interior floor of the body enclosure with a space between floors 7 and 8. At the front end the body has a vertical panel or end 10 and at the rear directly opposite thereto, a narrower tail piece or end 11, while on the two sides facing each other are the parallel vertical sides 6, 6, all these parts 6, 7, 8, 10 and 11, being rigidly and firmly united together by various kinds of securing means, including the triangular braces 69 at the rear and front corners, see Fig. 1, each maintaining said parts in fixed relation by being bolted interiorly thereto, whereby a very convenient and strong body or compartment of the trailer is provided and built also to contain needful articles for the interior of such a frame, the said parallel horizontal floor members 7 and 8 furnishing spaces between them to accommodate movable drawers at certain points, containers at other points, or storage receptacles as may be desired within a wide range for holding various articles.

7 denotes the bottom of the body and 8 the inner floor of the body.

Thus within the space between the floor levels 7 and 8, at the opposite sides of the body, it will be noted as shown in Figs. 1 and 4, that the horizontal drawers 15 are arranged to slide in and out and are accessible from the outside of the trailer. While these drawers 15 together take up the entire width of the body construction, their inner ends coming close to each other or close to a dividing plate, as the case may be, yet as to width they do not fill the entire space between the two ends 10 and 11 of the body. This is seen by referring to Fig. 2. At the rear the space between the floors 7 and 8 constitutes a storage space at 28, accessible through the hinged covers 14, 14 which are inserted in the floor 8, as shown in Fig. 3. At the right of the two drawers 15 in the front space between the floor levels 7 and 8, is a compartment 12, which is used as a refrigerator, properly packed and insulated so that it may serve that purpose, and its size being larger or smaller as desired, and adjoining it is a compartment 13 of somewhat similar or smaller size, if desired, which contains a considerable number of drawers or shelves to carry food stuffs or other articles of many and diverse kinds, there being a space between the front end 10 and these compartments 12 and 13, as shown in Fig. 2, wherein the leverage which functions with the side panels has an opportunity to operate and be enclosed.

A sunken square 9, of appropriate dimensions, is made in the central portion of the flooring 8 to accommodate when it is folded, a table 26, having legs 27. This is of the ordinary card-table type, having a substantial top with corner legs which are held open or closed by means of corner springs or clasps. When the table is folded with its legs underneath the top it can be readily laid into the recess 9 in such a way that it will be flush with the top surface of the floor 8, thus being packed entirely out of the way, but when withdrawn from the recess 9 and opened and elevated into the usable position shown in Fig. 1, it can function as a dining or supper table, a card-table of any other kind.

In order to provide seats which can readily be converted into bed supports, I hinge at 19 to the top edges of the vertically opposite sides 6, 6 of the main body, the horizontal shallow elongated panels 16, having interior spaces 17 and entered through the hinged openings 18, as shown in Fig. 3. These panels 16 are the covers of the main body, and they are hollow so that the interior spaces within these hinged covers may hold commodities, or parts, although for purposes of lightness and compactness they are made as small as possible, but they will hold bedding, tent equipment and various other things, and when the covers 16 are opened out the surfaces of these hinged covers afford convenient seats in close proximity to the table 26 and opposite each other within the interior precincts of the house or tent where several persons may rest and be comfortably placed with reference to the various objects to be used. These covers or seats 16 of course readily receive cushions which may form mattresses or beds for sleeping. Examples of these cushions are indicated at 72.

Besides these cover panels 16 thus hinged to the sides 6 of the rigid body frame construction I employ at each side mechanism composed of a plurality of panels adapted to occupy a vertical position to form the sides of the tent or house when the trailer is opened to establish a living room or tent. At each side there are two of these panels hinged together. The lower vertical panels 20 are hinged to the cover panels 16 by hinges 21, and the upper vertical panels 22 are hinged to the lower panels 20 by means of a longitudinal hinge 23 having a central pin or pintle. This arrangement of the vertical side panels is shown in Fig. 1, and the details of the hinging device are shown in Figs. 7 and 8. The hinge pin 23 has its end projecting beyond the edges of the panels 20 and 22 with a T-head adapted to be engaged by a slot 70 in the end of a brace rod 34 which will be hereinafter more fully explained.

When the trailer occupies its open position the side panels 20 and 21 will be supported vertically above each other as shown in Fig. 1, to form the sides of the chamber and the upper edges of the upper panels 22 will be connected by a roof consisting of a multiplicity of rafters 25 overspread with a canvas covering 24. The rafters 25 consist each of two sections centrally hinged together so that each complete rafter may be thus folded up into a small space when removed from the roof. The outer ends of each rafter 25 are provided with locking projections 46 projecting slightly beyond the ends of the rafters, which projections 46 engage slots 44 in plates 45 secured to the panels 22 near their upper edges, all as clearly shown in detail in Figs. 14 and 16 and displayed as to their exact relative arrangement in Figs. 1 and 2.

When the rafters are folded up the projections 46 are withdrawn from the slots 44 so as to readily disconnect the parts. In order that the rafters may fold in this way, the inner ends thereof as shown in Figs. 14 and 15 are provided with side plates 73 and 74. The side plate 73 is made of two interhinged parts, the hinge being at 47. Bolts 75 pass through one of the rafter sections and one of them engages a slot 76 in the plate 74 and is then tightly held by the thumb nut 48. Therefore, when a rafter is to be folded together its two parts are unlocked by the movement of loosening the thumb nut 48 and then turned upon the hinge 47 so that they can be placed alongside of each other so they will pack more easily within the body frame. There is thus overhead between the vertical panel 22 a series of these curved supporting rafters 23 constructed and applied for use as described and readily removable in collapsing the frame-work. They are held more rigidly in position and kept properly spaced with relation to each other by means of the central brace 29 which is a horizontal strip of metal passing beneath the inner portions of the rafters and having slots therein that are engaged by bolts provided with wing nuts 49 which enable the rafters to be clamped to the horizontal brace 29 and held firmly until it is desired to disassemble the parts. When the series of rafters are thus held firmly in place they uphold in a taut state the canvas covering 24 which is secured rigidly and permanently at its ends to the upper edges of the panels 22 at the points 77. See Fig. 1. In association with the top 24 I utilize extension tent coverings 30 having props 31 which rest on the ground and may be in several pieces. These extension covers spread some distance from back and rear and greatly enlarge the normal capacity of the tent wagon within the roof 24, making it virtually three times as big, and affording large and roomy accommodations for housing purposes. Everything is rigidly braced and securely held so that the extension canvas props 31 are not easily dislodged and when the parts are folded together these extension tops 30 can be thrown over the canvas top 24 and let down therewith during the collapsing of the mechanism which normally holds these parts, the sides, etc. in their upright location. The ridge pole strip 29 may suspend a curtain if desired to divide the tent enclosure. Poles 31 may be removed and covers 30 buttoned down tight.

I will now proceed to describe the links, braces and other parts by means of which the panel sides are held in their elevated position as shown in Fig. 1 and are brought down into the collapsed and folded position which is shown in Figs. 4 and 5. To the permanent and rigid body construction which carries within its integral combination of parts the triangular braces 69 for the sake of rigidity and strength, I attach pivoted links 32 which are pivoted directly to the braces 69. The links 32 are vertical when the tent is raised. See Fig. 1. Links 33 provided with elongated slots 104 are pivoted at their lower end to the cover panels 16 and at their other end at 78 to the upper ends of the pivoted links 32. Therefore, when the parts occupy the position shown in Fig. 1 where the trailer is entirely wide open, the links 32 stand upright, the said panels 16 are in a horizontal position at both sides of the body, being hinged as stated at 19 to the body sides 6, and these seat frames 16 are held fixedly in their horizontal position at this time by means of the links 33 that form with the links 32 the triangular supports as shown. At this time moreover, the panel sections 20 are occupying a vertical position, being hinged at 21 to the seat frames 16, and are kept in this vertical position by means of the removable horizontal braces 34 which are connected to the pivotal points 78 and the hinge 23, but it is to be noted that these braces 34, two on each side at each end, are only temporarily so placed, and that they are provided at their ends with open slots 70 which are adapted to engage the pins of the hinges 78 and 23 and be held there by thumb nuts 102 or other fasteners, but are also easily removable when the time comes to fold up these various parts into the collapsed and compacted position for travelling, as I have previously explained in Figures 6, 7 and 8, and as are more clearly indicated in Figure 9, where the hinge pin 103 is shown, the various links and the washers 105.

Furthermore, in order to complete the bracing of these parts more effectually, I employ at one or both sides of the trailer another brace 35 which has at the ends open slots of the same or a similar design to that shown in link 34, Fig. 8, at 70 and 71, so that engagement of this brace may be made at hinge 78 or 103 and also at the junction of one of the rafters 25 which the panel 22, suitable provision being made at that point for the purpose in the same manner as indicated in the parts shown in Figs. 7, 8 and 9, the brace or braces 35 being thus allowed to function to strengthen the parts when they are in the open position shown in Fig. 1. Such a bracing is particularly important in view of the fact that the upper panels 22 are hinged at 23 with the lower panels 20, so that the two panels 22 are directly above the panels 20 and constitute the vertical sides of the enclosure.

When it is desired to collapse the different parts however, into a close infolded pack for a running position, the upper diagonal braces 35 are removed, and also the horizontal braces 34 are both removed by loosening the nuts as stated, or employing any equivalent means, and when the parts are thus relaxing and set free, more or less, the collapse and folding of the superstructure takes place with ease. So long however, as the tent formation of the enclosure is in use, and the interior room needed for use, it is necessary that the entire combination should be strong and stable against wind and storm of any kind, and pressure due to strains on different parts by the movable or stationary weights within the interior of the enclosure, and this interbraced condition is effected by these removable braces and the links which I have just been describing.

When the time comes to collapse the canopy construction and fold in the lateral panels and tear down the enclosure so as to pack its various parts neatly and composedly in the body of the vehicle, the parts are first caused to assume the position shown in Fig. 4, and then the completely folded position shown in Fig. 5. These stages in the unfolding of the parts are specified for explanatory purposes chiefly. When the trailer is entirely shut up, the permanent body of the vehicle whose sides are denoted at 6, and whose ends are denoted at 10 and 11, is covered by the two hinged seat covers 16 which will have now been turned over from the outlying position in Figs. 1 and 4 into the covering position shown in Fig. 5, through an arc of 180°.

In order to first bring down the superstructure for folding it up, the braces 34 and 35 having been first removed, the upper and lower panels 20 and 22 will be pushed horizontally inwardly at their hinged point 23, and the upper canvas roof 24 caused to drop down into the position shown in Fig. 4. Before the tent-like canvas can thus be lowered, it will of course be necessary to remove the rafters 25 which can easily be done from the foregoing description of their construction and arrangement, and then they will be folded together on their central hinges and laid away in the main body. When the sides are thus folded in, the lower panels 20 will rest flat on the cover panels 16, and the upper panels 22 will rest flat on the flat panels 20, but in the position shown in Fig. 4, with the triangular supporting bracing arrangement 32 and 33 remaining in the normal upright position as before, as shown in Fig. 4, though at this time on each side the three panels 16, 20 and 22 are superposed flatwise one over another and thus brought together in a small space.

This having been done, the panel cover 16 at each side is lifted on its hinges 19 and turned over into the closed position shown in Fig. 5, in the movement of which the links 32 and 33 are lowered, said links 32 turning on their lower pivots 79, at brace 69, into the position in Fig. 5, and also at this time the links 33 which are pivoted to the seat panels 16 will move down into the position shown in Fig. 5, but in so doing in order to fold these links 33 it will be necessary for the pivotal devices 78 which conjoin the links 32 with the links 33 to travel down the length of the elongated slot 104 in each link 33 to the farther end of such slot so that each pair of links 32 and 33 will occupy the positions shown in Fig. 5 where they are down inside of the main body and out of the way, said main body being now completely covered by the seat panels 16. The tops of covers 16 are suitably curved to present a neat appearance, and these inner edges are of some substantial width due to the fact that these panels contain storage spaces 17, said edges will be in contact with each other vertically as shown in Fig. 5, and the joint where they meet will be covered by a weather or finishing strip 80 carried by the edge of one of the panels 16 and overlapping the other when the two panels are in the closed attitude indicated in Fig. 5. When this occurs the canvas canopy 24 will drop lower into the main body and out of the way and, if as happens before the lowering of these parts the extension canvases 30 have been folded over on to the top of the upper canvas 24, the entire bunch of canvas pieces will be caused to enter into the interior of the main body and be safely taken care of, it being noted that said main body is commodious and able to take care of many articles placed therein on top of the flooring 8 and the central table 26 carried in the recess 9.

It may be remarked here that one or both of the panels 20 and 22 may be provided with windows; usually it is sufficient to fit the panel 22 with a pair of small windows, indicated at Fig. 2, which may vary in construction, but a convenient form of window consists of an oval shape which is filled with an isinglass medium or mica and covered with a fine screen in the usual way. In order that the group of panels when folded together as shown in Figs. 4 and 5 may be immovably held in closely packed relation, I find it convenient to apply to the end thereof after they have been so placed small removable clamps as shown at 81, but the particular type of clamp is not essential and any kind of a holder may be employed which can be taken off at the time of unfolding of the parts.

Returning to a consideration of the interior of the trailer when it is open into its service position for camping or other purposes as shown in Figs. 1, 2 and 3, it may be observed that when the cover or seat panels 16 are in position, only two seats are provided for, but these are long enough to accommodate several people on each, in a sitting posture, and they will be found comfortable and easy, especially if provided with cushions 72. At this time there is plenty of room between the seats 16 for the table 26, for dining or writing, or card-playing, or other forms of amusement or use. This same arrangement thus fitted would be clearly satisfactory for sleeping accommodations for two people, one on each of the said cushions. There is space enough however, between the two seats 16 where the table stands at times, to provide for two other persons, thus allowing a possible arrangement of four beds alongside of each other. In order to make this possible and furnish the requirements for this kind of extension of sleeping accommodations, I utilize two separate and independent bed frames in addition to the two seat frames, which extra bed frames are removable and also foldable, and these I have represented in a somewhat modified form of the invention as illustrated in Figs. 10, 11, 12 and 13. Everything already described remains the same and is supplemented by the addition of the two bed frames 50.

These frames 50 have a length substantially equal to the length of the seat frames 16 and about the same width which makes it possible for two such frames to be placed between the sides 6 of the body, see Fig. 10. These frames can occupy either a horizontal position or a vertically inclined or upright position, the horizontal being obviously for sleeping, and the vertically inclined being the position that the beds can be made to occupy when not in use, and particularly when the occupants are arranging their accommodations for the night. The frames 50 may be of any suitable bed frame construction, with wire mattresses or box-like frame, and I do not wish to be confined to any particular style or type. Said frames 50 will carry the cushions or mattresses 52. The frames 50 are provided with end sections 53 hinged thereto at 82, and having angle piece ends 97. When the frames 50 are horizontal the end sections 53 will be horizontal also and properly alined with frames 50, as seen in Fig. 11, but when the frames 50 are in their upright position, the sections 53 will be in horizontally inclined position, and their end 97 will rest upon the top of the refrigerator compartment 12 or some approximate part of the main body, while at this time the bed frame 50 is in a vertically-inclined position, as shown in Fig. 12, and the mattress 52 which reposes upon the upper surface of this bed is bent at an angle near one end thereof so that it may be temporarily out of the way just as the bed itself is when in this position. The under-side of the bed-frame 50 is provided at the end opposite the section 53 with a folding frame 39, which is hinged to the frame 50, and when the bed is extended as in Figure 2, will support one end of the bed, the other end being supported near the refrigerator 12, but when the bed 50 is lifted, the frame 39 will be folded against the same and held in place as shown in Fig. 10. The underside of the frame 50 is also provided with small mirrors 83, clothes hangers 84, and also with flexible cords or wires at 85, to accommodate the hanging of clothes and the disposition of toilet accessories, the same having functions therewith when the beds are in either position.

It will be noted that the end sections 53 are provided with projecting rails 86, that fit under small flanges or lips 87, projecting from the end of the frames 50 at a point where there is a gap 88 between the members 50 and 53, so that the member 50 may easily turn on the pivot 82 between rail 86 and lip 87 when the bed 50 is raised into its inclined position, for when it is so raised the effect will be to lower the pivoted section 53 so that it will be brought closer to the top of the refrigerator 12 and made to rest at one end 97 directly thereon. At the same time a rod 89, with which the bed frame 50 is provided on its under side, is caused to be supported at one end in a V-bearing formed by a notch 90, in the upper end of a vertical rod 40, carried fixedly in a socket 41 which is held by clamping means 43 to the front side of the refrigerator 12, the lower end of which rod 40 is provided with a plate 42 that rests loosely on the floor 8 of the car body without being necessarily bolted thereto. Plate 96 on refrigerator 12 is also carried by rod 40. The other end of this rod 89 passes through an angle piece 93 at the edge of the bed 50 and finds a bearing at 94 in a block 95, attached to the adjacent side 6 of the main frame. The bolts 43 which are provided on plate 96 on the side of the refrigerator 12 have a pair of clamping nuts 91, by means of which the device which includes this post 40 that carries bearings 90 is firmly held and anchored in the position that it must needs occupy in order to uphold this end of the bed at all times, not only when it is lowered into sleeping position, but also when it is elevated into inactive position.

Thus by means of these additional parts, it is easily possible to enlarge the capacity of the trailer, so that it will accommodate four beds. In the use of such beds it may be suggested that after the occupants have entered the side beds 72 on the seat frames 16, the other two occupants can prepare for bed with their own center beds in the elevated position shown in Fig. 10, and then by standing upon the lower ends of the beds 72, the beds 50 can be lowered into sleeping position. This can all be carried out in a very convenient and effective manner, because it will be found that the beds have ample capacity for making the different moves necessary to locate the parties in the desired location.

In case four beds are employed instead of two, it will be found that the main trailer body has had ample capacity to receive and contain them, and when the closing of the body takes place, as illustrated in Figs. 4 and 5, the beds 50 can be lowered into the bottom of the body by folding up the legs and supporting parts, and caused to occupy a very small space, for it will be noted that the folding up of the bracing leverage and linkage at both ends of the body will not be interfered with by the presence of the two extra beds, as there will be plenty of room at the ends of the same for the links and braces as will be indicated by reference to Fig. 3.

In the daytime when the beds 50 are out of service and are standing elevated and the side cushions 72 are being used as cushions, it is obvious that the bed cushions 52 may be removed from the frames 50 and utilized as backs against the panels 20 and above the seat cushions 72, and in case only two persons are occupying the trailer and it is equipped with the four beds, the two inner beds 50 can be easily removed and taken outside of the body and temporarily laid aside, as this would produce more roominess and convenience in the interior of the trailer, and this is easily accomplished because the supports and hinging of the inner beds 50 easily permits this, and also permits their replacement at very brief notice and with very slight exertion.

When the device is open for use, although the wheel 2 is small and the body with its floors is not very high above the ground, yet it may be found too high to easily step into, and accordingly I have applied to the rear of the trailer a folding step consisting of a back 36 which is provided at its upper end with a hinge or hook 98 adapted to be connected over the adjoining edge of the rear side 11 of the body so that it may be hung in the position shown in Fig. 2, being detachable from the body or else hinged thereto in such a way that it can be folded up out of the way. To this back 36 is hinged at 99, a step 37, and a link 38 is attached at 100 to the upper edge of the board 36 at each end, having therein an elongated slot 92 engaged by a pin 101 on the end of the step 37 so that the step 37 may be folded up against the back piece 36. When the step is let down however in its horizontal position, it will be at a level below the bottom of the body and directly opposite to the chassis 1, and hence only a short distance above the ground and will easily permit a person to step upon it and thus easily step up into the inside of the trailer. When the step is not needed for use it can be detached and packed away.

A trailing house of the kind I have described adapts itself to such a wide variety of uses that its values are inexhaustible, and it is unnecessary to recount them in order to make them easily understood, as they will be evident from the foregoing description of the construction and operation, even to one who casually inspects the same. The very great value of the present combination consists in the wide and commodious apartment which is provided when all the parts are open, and the neat, compact and efficient small closed trailerette unit into which the large and expanded house is metamorphosed when the vehicle is shut up as it is seen in Fig. 5. I place great stress upon the dual function seats 16 which serve as covers for the closed body and when open extend horizontally along the sides of the body in such a manner as to make an unusually wide supporting seat, and the linkage and leverage arranged in connection with these wide seats so that along the outermost edge of each seat vertical walls may be built up and pressed together in a panel-like construction held firmly in their vertical attitudes, and operating to support at a convenient height the canopy or tent-like top or roof which covers over all.

With a few easy movements of the links and the members which are inter-hinged with the body, and without the exertion of any great amount of strength, the various parts can be infolded or lifted into service position, and the closed box as it appears when traveling on the road can be converted into a substantial residential house thoroughly braced and furnished and rigidly maintained against all the stresses and strains of use and weather wherever it may be desired to place it.

Of course, as heretofore stated, this traveling unit which tows after a car in a tandem fashion has no inherent propelling power in the great majority of cases, but is an added member that can be given life only by being attached to some kind of an engine which runs ahead of the same as an automobile and swiftly draws this unit after it. Various attempts have been heretofore made to provide a similar small trailerette for motor cars, but with little success, because of mistakes in most cases due to faulty construction and improvident planning. The house has usually been built on too large a scale and has been too heavy and not under sufficient control when hooked up to the motor car. It is found in actual use that my conventional chassis with only a single swivelled wheel is adapted to run under better control and to make its way more easily and satisfactorily over the highways and in traffic than where a larger car with more ponderous running gear is used.

My aim throughout has been to provide a trailerette which would be unusually light and small to enclose when in running condition, and would also be of exceptional interior size when opened up for use, the connection of the various wheels and extension parts being such as to permit this; and even though the enclosure formed by the parts when they are open would be unusually roomy and comfortable and adaptable for quite a large company, the housing facilities being equal to those of a tent of substantial size or a house of fair proportions, all this has been obtained by the peculiar and efficient mechanical construction which has been embodied in my device.

The feature of supporting the body and its affiliated parts upon a series of jacks is both novel and useful and gives a very firm foundation for the structure. The fundamental idea has been that of compactness and security when the device is closed and liberal width and a commodious interior when it is open, and this has been attained by the combination of elements set forth.

It will of course be understood that I am not to be restricted to the precise disclosure in all its details that I have herein illustrated and described. Many changes and variations may be made in the various embodied parts and this can be done within a wide range of equivalents which can be substituted for the special parts which I have herein presented. Rearrangements and new combinations and variations of many of the essential parts may be made, and I reserve the liberty of so changing and arranging the parts to suit the exigencies of any situation and the difficulties which may be presented to meet special requirements, as may be found possible within the scope of the ensuing claims.

What I claim is:

1. In a vehicle of the class described, the combination of a roof, a body, hinged covers thereon, side panels hinged to the said covers, a series of rafters detachably connected to the side panels, a tent covering also connected to the side panels and supported by the rafters, and linkage for upholding the said panels when the superstructure is open, said linkage comprising interfolded members of a pair, one of which is pivoted to the body and the other to the seat panel, while the pivot between them operates in an elongated slot in the link pivoted to the cover panel and detachable brace members engaging the parts to hold them in the open position.

2. In a trailer of the class described, the combination of a chassis having one or more wheels, the body of said chassis provided with interior compartments for storage, food stuffs and other things, cover panels for said body hinged thereto, and having inner storage spaces, together with a superstructure adapted to fold into the body and be unfolded and liftable from the body, comprising essential panels hinged to the outer edges of the covers and erected in vertical position when the cover panels are horizontal, other panels hinged to the top edges of the aforesaid panels and alined vertically therewith when the trailer is open, a series of rafters temporarily engaged with the top edges of the vertical panels, and a roof comprising a canvas supported on said rafters and permanently engaged with the upper edges of the upper panels, together with triangular pivoted linkage means connecting the said panels with the interior of the body and removable braces between the interhinged joints of the side panels and the joints in the triangular link devices to keep the parts firmly in their relative position when extended.

3. In a trailer of the class described, the combination with a body having interior storage compartments for various articles including a refrigerator and food spaces, said body being firmly braced in position and comprising sides and end members, cover panels for said body hinged to the upper edges of the sides thereof and adjustable to a movement of 180° so that when open in a horizontal position, they may serve as seats, means for supporting said panels in said position comprising links hinged thereto and other links hinged within the body and having a pin and slot connection with the aforesaid links, side panels hinged centrally and foldable upon and with the seat panels, bracing devices for temporarily holding the side panels in their vertical position when the parts are open, and a roof supported at the upper edges of the side panels and comprising a series of rafters temporarily connected to the side panels and removable therefrom, and a flexible roof supported on the rafters and permanently attached to the upper edges of the side panels so as to be collapsed when the parts are all interfolded for insertion into the body section.

ALFRED K. STEWART.